D. O. GREEN.
KITCHENETTE CABINET.
APPLICATION FILED AUG. 4, 1921.
1,421,456.
Patented July 4, 1922.
2 SHEETS—SHEET 2.
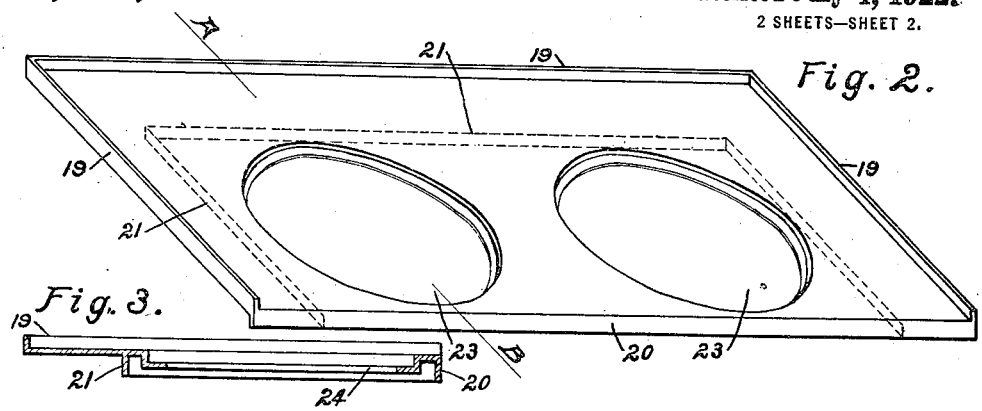
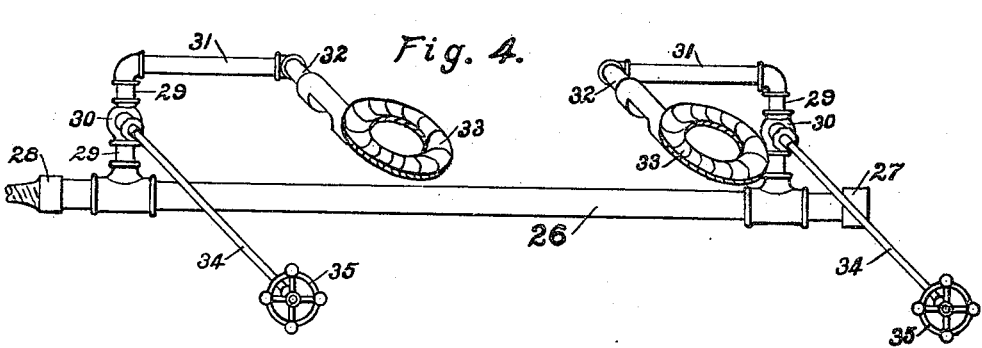
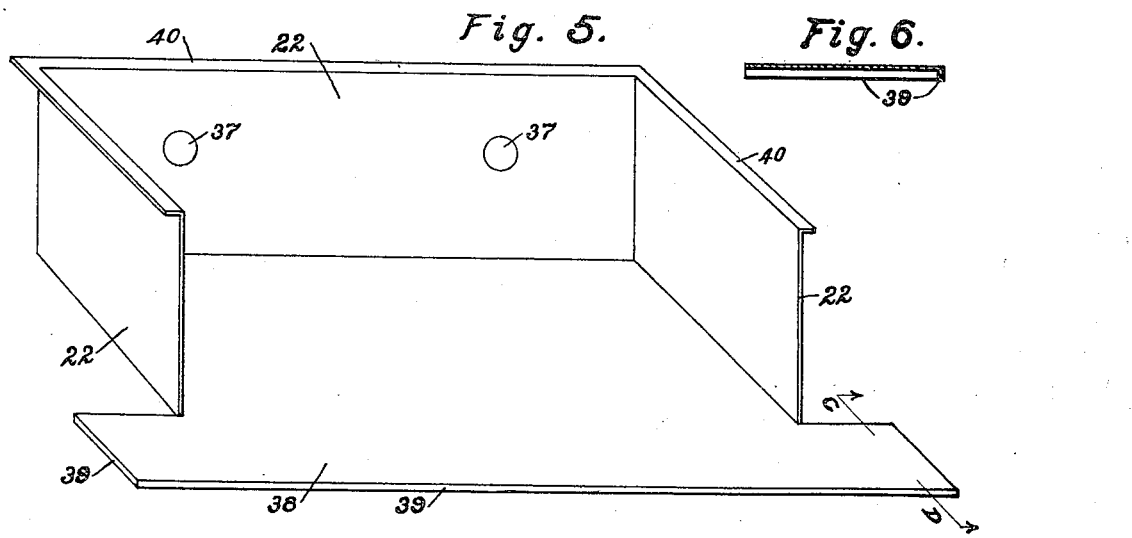
WITNESSES
Zelma P. Shepherd
F. R. McDonald
INVENTOR,
Daries O. Green.

UNITED STATES PATENT OFFICE.

DARIES O. GREEN, OF TOLEDO, OHIO.

KITCHENETTE CABINET.

1,421,456.      Specification of Letters Patent.      Patented July 4, 1922.

Application filed August 4, 1921. Serial No. 489,668.

*To all whom it may concern:*

Be it known that I, DARIES O. GREEN, a citizen of the United States of America, residing at Toledo, in the county of Lucas and State of Ohio, have invented a new and useful Kitchenette Cabinet.

My invention relates to improvements in house furnishing cabinets in which a means for cooking is combined in a cabinet containing shelf room and storage space for utensils and articles used in conjunction therewith: and an object of my invention is to provide a cabinet having a hotplate, shelf room and room for storing utensils, and means for opening and closing same.

It is also an object of my invention to provide a portable cabinet, which will dispose of the necessity of a special room for cooking purposes.

Another object of the invention is to provide a novel arrangement whereby the space under the hotplate can be used as an oven.

The invention consists in the details of construction and, in the combination and arrangement of the several parts of my improved kitchenette cabinet, which is calculated to supply an existing demand which has not in like manner been supplied, as will be hereinafter more fully set forth.

The novel features of my invention will hereinafter be definitely claimed.

The following description in reference to the accompanying drawings will show the full scope of my invention, in which:

Figure 2 is a perspective view of a hotplate.

Figure 3 is a sectional view of Figure 2 on line A—B.

Figure 4 is a perspective view of a pipe system.

Figure 5 is a perspective view of a pan.

Figure 6 is a sectional view of Figure 5 on line C—D.

In the following description similar numerals refer to similar parts in the several views.

Figure 1:
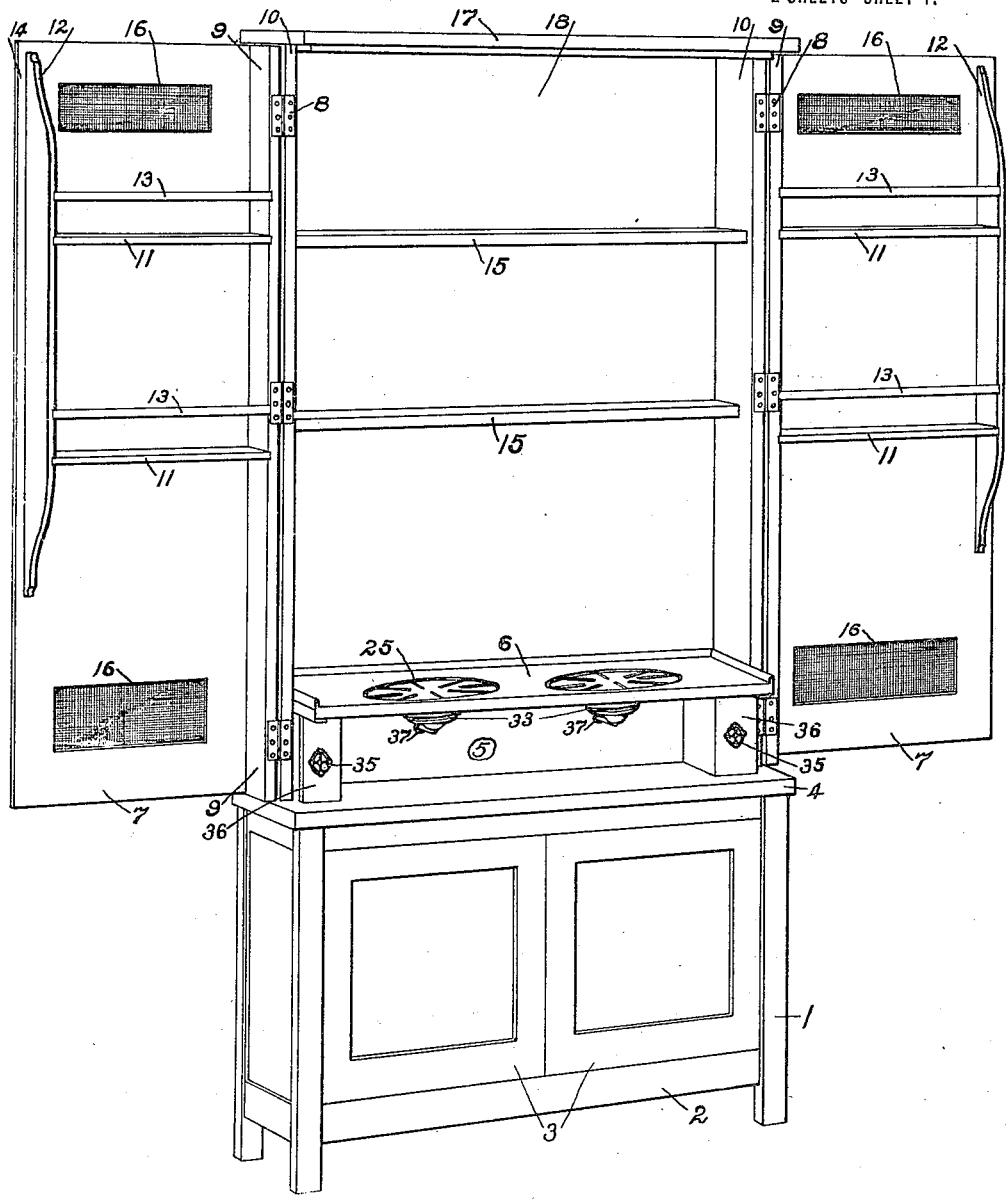
Figure 1 is a perspective view of a kitchenette cabinet with the upper doors opened and exposing the interior of the upper part of the cabinet, including the hotplate.

The cabinet Figure 1, may be of any approved design and construction for cabinet work of this class. In the drawings, 1 Figure 1, is a corner piece which extends below the bottom rail 2, constituting legs upon which the cabinet stands. The doors 3 open into a compartment which is separated from the upper part of cabinet by the shelf 4 and the pan 5. The hotplate 6 is supported over the pan 5, and in contact with the upper margin of same.

Around the pan 5 and hotplate 6, is constructed the shell of the upper compartment which rests on the shelf 4, and extends a suitable distance above the hotplate 6. The doors 7 extend the full length of the compartment, and are hinged at 8, approximately one third the distance between the two corners of the sides of the compartment with one third of the side made a part of the door. When the doors 7 are open, as they are shown in Figure 1, the angular portion 9 of the doors 7 folds back to the portion 10 exposing a portion of the hotplate 6.

The shelves 11 are supported at one end by the angular side 9, of the door, and at the opposite end by brackets 12 and, are provided with guards 13 which prevent articles falling off when the doors are operated for opening and closing. The brackets 12 are set in from the edge of the doors leaving a margin 14 to properly clear each other when the doors are opened and closed.

The shelves 15 are supported at each end by the sides 10 and are not as wide as the sides 10 leaving a clear working space over the hotplate, and a free circulation of air through the compartment when the doors are closed.

The ventilators 16, one at the bottom and one at the top of each door, are constructed of woven wire or any suitable material for admitting the circulation of air through the upper compartment when the doors are closed.

The top 17 and the back 18 are to be of any suitable material and construction for this class of work.

The hotplate, as will be seen by Figure 2, is an improved hotplate, and as shown at 6, in Figure 1, covers the entire horizontal sectional area of the cabinet. It has an upstanding flange 19 on the back and two side marginal edges for reinforcing the plate and preventing substances dropping over the plate. In front the flange 20 is depending from the underside leaving the top plane of the hotplate free from any obstruction to work over. The flange 21, shown by the broken lines in Figure 2, and in section in Figure 3, is a depending flange corresponding in dimensions to the horizontal interior dimensions of the upstanding sides 22 of the pan, Figure 5, and engages the upper edge of these sides when assembled. The flange 21 extends around the grate holes 23 and reinforces the hotplate at these points. The grate holes 23, Figure 2 and Figure 3, are provided with flanges 24 for supporting the grates 25, Figure 1. The grates 25 are of ordinary construction.

The pipe system Figure 4 is an improved pipe system and is so designed that the pipe is all at the rear of the hotplate and pan, leaving the front clear of all obstruction. The main pipe 26 is provided with a cap 27 at one end and a hose nipple 28 at the opposite end, and is long enough to extend the entire width of the cabinet with the cap 27 and the hose nipple 28 projected through the sides 10. By this arrangement it will be seen that the cap 27 and nipple 28 can be transferred to either end of the main pipe 26 for connecting to the house main. From the main pipe 26 the gas is conducted through riser pipes 29 and valves 30, and horizontal pipes 31 and nipples 32 to the burners 33. The flow of gas is regulated by the valves 30 which are operated by the stems 34 and wheels 35. The stems 34 are elongated and extend through the supports 36, Figure 1. The supports 36 are recessed on the shelf 4 to provide space for the wheels 35 to clear the doors when closed. The nipples 32 coincide with and project through the holes 37 in the pan 5, Figure 1. The holes are also shown in detail in Figure 5. The burners 33 are then attached to the nipples.

The pan 5 Figure 1, also shown in perspective in Figure 5, is constructed of sheet metal with three upstanding sides 22. The fourth and front side is open. The bottom 38 extends past the sides 22 to cover the shelf 4. The marginal edges of the bottom 38 has downturned flanges 39 to stiffen the metal which is shown in detail in Figure 6. The sides 22 have overturned flanges 40 to stiffen and strengthen them.

From the foregoing description it is believed to be obvious that a cabinet constructed in accordance with my invention will supply an already existing demand that has not been supplied by any like means, and it will also be seen that my invention will admit of some change and modification without departing from the principles and spirit thereof and I do not wish to be understood as limiting myself to the precise arrangement and formation of the several parts as herein shown in carrying out my invention in practice except as hereinafter claimed.

It will also be seen by the foregoing description that a cabinet constructed according to my invention can be set up in any room or place where it is desired to cook and prepare meals and when not in use for cooking can be closed up concealing the hotplate, utensils and other articles stored in the cabinet leaving in view only the cabinet.

It is also thought to be obvious that any kind of fuel adapted to be burned under a hotplate can be used in a cabinet constructed according to my invention.

It will also be seen that the hotplate and pipe system are separately mounted and not attached one to the other and that the hotplate rests loosely on the walls of the pan and constitutes the top of the oven and can be removed without disturbing the pan or pipe system. The hotplate may also be additionally supported by ledges formed on the side walls of the cabinet.

I claim:

1. In a cabinet the combination of a loosely mounted hotplate, a separately mounted pipe system and a stationary pan mounted on a shelf, said pan having upstanding walls at the rear and two sides thereof, the extreme upper marginal portions of said walls having outward turned flanges, the front side of pan being open, the bottom of said pan extending forward past the two end walls, the extreme marginal edges of said bottom having downturned flanges and the rear wall of said pan provided with openings for passing of pipes to burners.

2. In a cabinet the combination of a loosely mounted hotplate, a separately mounted pipe system and burners, a stationary pan mounted on a shelf, said hotplate having upstanding flanges at the rear and two side marginal edges thereof, a depending flange at the front marginal edge thereof and a depending flange on the interior under portion thereof, means for supporting grates over said burners and said hotplate loosely mounted over said pan and said pipe system substantially as described.

Signed, this 1st day of Aug., 1921, at Toledo, Ohio, U. S. A.

DARIES O. GREEN.

Witnesses:
ZELMA R. SHEPHERD,
F. R. McDONALD.